US008797311B2

(12) United States Patent
Kim

(10) Patent No.: US 8,797,311 B2
(45) Date of Patent: Aug. 5, 2014

(54) ORGANIC LIGHT EMITTING DISPLAY AND IMAGE COMPENSATING METHOD THEREOF

(75) Inventor: Yang-Wan Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 124 days.

(21) Appl. No.: 12/870,723

(22) Filed: Aug. 27, 2010

(65) Prior Publication Data

US 2011/0050674 A1 Mar. 3, 2011

(30) Foreign Application Priority Data

Sep. 1, 2009 (KR) ........................ 10-2009-0081974

(51) Int. Cl.
*G06F 3/038* (2013.01)
*G06F 3/041* (2006.01)

(52) U.S. Cl.
USPC .......................................... 345/211; 345/173

(58) Field of Classification Search
USPC ........... 345/207, 211, 212, 208, 189, 82, 690, 345/691, 214, 76
See application file for complete search history.

(56) References Cited

U.S. PATENT DOCUMENTS

| | | | | |
|---|---|---|---|---|
| 2004/0108518 | A1* | 6/2004 | Jo | 257/200 |
| 2005/0280638 | A1* | 12/2005 | Oda | 345/173 |
| 2006/0012311 | A1 | 1/2006 | Ogawa | |
| 2008/0036703 | A1* | 2/2008 | Wang et al. | 345/76 |
| 2009/0256810 | A1* | 10/2009 | Pasquariello | 345/173 |

FOREIGN PATENT DOCUMENTS

| | | |
|---|---|---|
| JP | 2004-4673 | 1/2004 |
| JP | 2006-030317 A | 2/2006 |
| JP | 2008-046617 A | 2/2008 |
| KR | 10-2009-0057855 | 6/2009 |

OTHER PUBLICATIONS

KIPO Office action dated Mar. 15, 2011, for Korean priority Patent application 10-2009-0081974, noting listed references in this IDS.

* cited by examiner

*Primary Examiner* — Michael Faragalla
(74) *Attorney, Agent, or Firm* — Christie, Parker & Hale, LLP

(57) ABSTRACT

An organic light emitting display device and a method of compensating image of the organic light emitting display device. The organic light emitting display device includes a sensing circuit that is separate from a pixel circuit to sense a current supplied by a driving transistor. Accordingly, mura, spots, or image sticking generated due to deterioration of the driving transistor may be compensated for.

8 Claims, 6 Drawing Sheets

ORGANIC LIGHT EMITTING DISPLAY AND IMAGE COMPENSATING METHOD THEREOF

CROSS-REFERENCE TO RELATED APPLICATIONS

This application claims priority to and the benefit of Korean Patent Application No. 10-2009-0081974, filed on Sep. 1, 2009, in the Korean Intellectual Property Office, the disclosure of which is incorporated herein in its entirety by reference.

BACKGROUND

1. Field

Aspects of one or more embodiments of the present invention relate to an organic light emitting display device and an image compensation method of the organic light emitting display device.

2. Description of the Related Art

Various flat panel display devices are manufactured having reduced weight and volume in comparison to cathode ray tubes. Examples of the flat panel display devices are a liquid crystal display (LCD), a field emission display (FED), a plasma display panel (PDP), and an organic light emitting display device.

An organic light emitting display device displays an image by using organic light emitting diodes (OLEDs), wherein the OLEDs emit light via recombination of electrons and holes. The organic light emitting display device has high response speed and low power consumption.

However, in order to obtain uniform image quality, a pixel circuit of the organic light emitting display device is configured to compensate for different characteristics between different thin film transistors (TFT) in a pixel. In addition, organic materials may deteriorate, and thus efficiency of the OLED may be decreased and thus luminance thereof may also be decreased. That is, when the OLED deteriorates, resistance thereof increases, and for a given voltage, a current flowing to the deteriorated OLED is decreased as compared to a current when the OLED has not deteriorated, thereby decreasing the luminance.

Typically, during an initial production stage, large organic materials are purposely aged to deteriorate the organic materials beforehand so that products including the organic light emitting materials may be stably used. However, despite the aging, when an image is displayed for a long time and then another image is displayed, the previous image still remains. In other words, afterimage effect or image sticking is generated.

In order to compensate for the above-described different characteristics of TFTs and image sticking, various compensation circuits have been developed. However, when these compensation circuits are applied, a pixel circuit has a complicated structure, and thus it is difficult to achieve high resolution.

SUMMARY

Aspects of one or more embodiments of the present invention relate to an organic light emitting display device that senses a current of a driving transistor of a pixel circuit to compensate for mura and image sticking, and a method of compensating for an image displayed by the organic light emitting display device.

According to one or more embodiments of the present invention, an organic light emitting display device includes: a plurality of pixels, each of the pixels including: an organic light emitting diode; and a pixel circuit including a driving transistor for driving the organic light emitting diode; and a switching transistor for switching a current flowing through the driving transistor in response to a sensing signal; and a sensing circuit for sensing the current and performing mura correction and image compensation based on the current.

The sensing circuit may include: an analog-digital converting circuit for converting the current into sensing data; a mura correction circuit for comparing the sensing data with original data provided from the pixel circuit to generate mura correction data; and an image compensating circuit for generating image compensation data to compensate for image sticking in accordance with the mura correction data and a lookup table.

The sensing circuit may be separate from the pixels.

The sensing circuit may further include a current source for providing a current for adjusting a gate-source voltage of the driving transistor.

The lookup table may be generated by comparing the sensing data with previously sensed sensing data.

The pixel circuit may be configured to apply a voltage to a cathode electrode of the organic light emitting diode such that the organic light emitting diode is reverse-biased when a sensing signal is applied to turn on the switching transistor.

According to one or more embodiments of the present invention, an organic light emitting display device includes: a plurality of pixels, each of the pixels including: an organic light emitting diode; a pixel circuit including a driving transistor for driving the organic light emitting diode, and a switching transistor for switching a current flowing through the driving transistor in response to a sensing signal; a current source for providing a current for adjusting a gate-source voltage of the driving transistor; an analog-digital converting circuit for converting the current into sensing data; a mura correction circuit for comparing the sensing data with original data provided from the pixel circuit to generate mura correction data; and an image compensating circuit for generating image compensation data to compensate for image sticking in accordance with the mura correction data and a lookup table.

According to one or more embodiments of the present invention, a method of compensating for an image displayed by an organic light emitting display device including an organic light emitting diode and a pixel circuit including a driving transistor for driving the organic light emitting diode, the method including: sensing a current supplied by the driving transistor and converting the current into sensing data; comparing the sensing data with original data to generate mura correction data; and generating image compensation data to compensate for image sticking of the organic light emitting display device in accordance with the mura correction data and a lookup table that is generated by comparing the sensing data with previously sensed sensing data.

The method may further include reverse-biasing the organic light emitting diode by applying a voltage to a cathode electrode of the organic light emitting diode.

The method may further include sensing the current supplied by the driving transistor by turning on a switching transistor coupled to the driving transistor in response to a sensing signal.

The method may further include providing a current for adjusting a gate-source voltage of the driving transistor.

The lookup table may be generated by comparing the sensing data with previously sensed sensing data.

The organic light emitting display device according to the embodiments of the present invention includes a sensing circuit that is located outside a pixel circuit and senses a current of a driving transistor to compensate for mura or spots and image sticking generated by deterioration of the driving transistor.

BRIEF DESCRIPTION OF THE DRAWINGS

These and/or other aspects of the present invention will become apparent and more readily appreciated from the following description of exemplary embodiments, taken in conjunction with the accompanying drawings of which.

DETAILED DESCRIPTION

Figure 1:
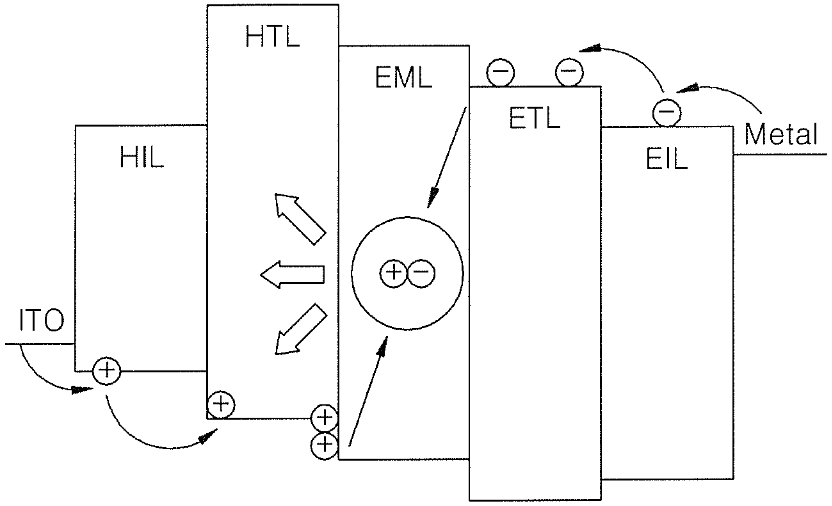
FIG. 1 is a conceptual diagram of an organic light emitting display device.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present invention.

An organic light emitting display device electrically excites fluorescent organic compound materials to emit light. The organic light emitting display device includes a plurality of organic light emitting cells that are arranged in a matrix, and the organic light emitting cells are voltage-driven or current-driven to display an image. The organic light emitting cells have diode-like characteristics, and thus may be referred to as organic light emitting diodes (OLEDs).

FIG. 1 is a conceptual diagram illustrating an organic light emitting display device.

Referring to FIG. 1, the organic light emitting display device includes an anode electrode layer (indium tin oxide, ITO), a thin organic layer, and a cathode electrode layer (metal). The thin organic layer includes an emitting layer (EML), an electron transport layer (ETL), and a hole transport layer (HTL) in order to improve light emitting efficiency by balancing electrons and holes.

A method of driving the organic light emitting cells includes a passive matrix method and an active matrix method that uses a thin film transistor (TFT) or a metal oxide semiconductor field effect transistor (MOSFET). In the passive matrix method, an anode and a cathode are disposed to cross each other and may be driven by selecting a line thereof, and in the active matrix method, a TFT is connected to an ITO pixel electrode, and the ITO pixel electrode is driven according to a voltage that is retained by a capacitor connected to a gate of the TFT. The active matrix method may use a voltage programming method or a current programming method according to the type of a signal transmitted to the capacitor in order to charge the capacitor and maintain the charge.

Figure 2:
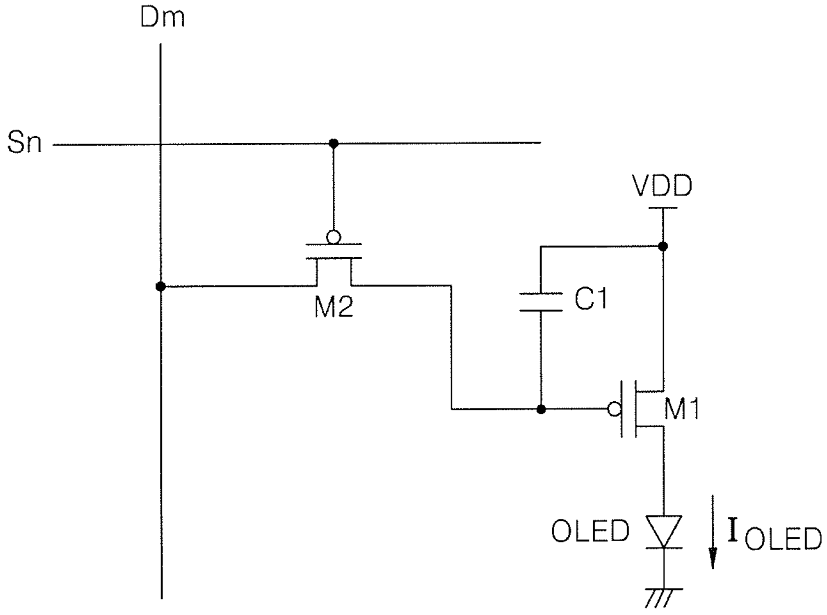
FIG. 2 is a circuit diagram illustrating a pixel circuit according to a voltage driving method of the related art.

FIG. 2 is a circuit diagram illustrating a pixel circuit according to a voltage driving method of the related art.

Referring to FIG. 2, a switching transistor M2 is turned on by a selection signal supplied from a selection scanning line Sn, and when the switching transistor M2 is turned on, a data voltage transmitted from a data line Dm is transmitted to a gate of a driving transistor M1, and a potential difference between the data voltage and a voltage source VDD is stored in a capacitor C1 connected between the gate and a source of the driving transistor M1. A driving current $I_{OLED}$ is transmitted to an OLED in accordance with the potential difference, and the OLED emits light accordingly. Here, according to a voltage level of the applied data voltage, difference levels of brightness may be displayed.

Figure 3:
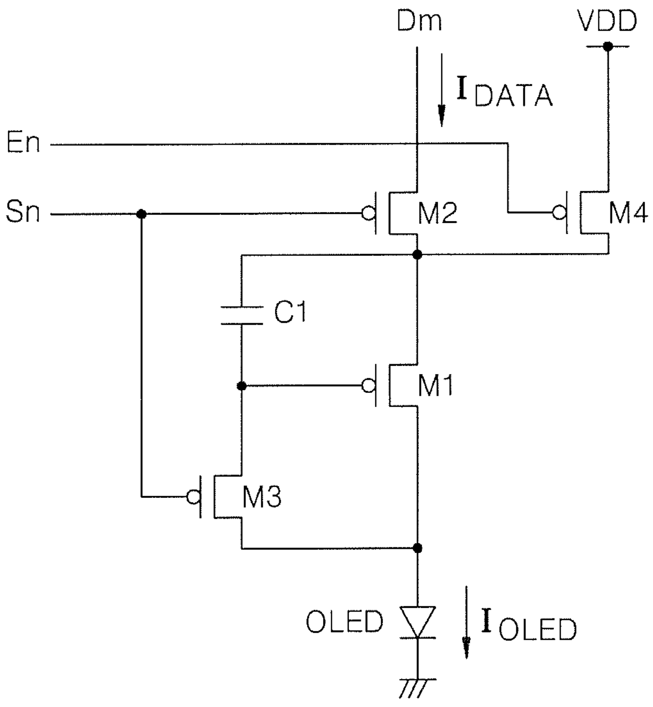
FIG. 3 is a circuit diagram illustrating a pixel circuit according to a current driving method of the related art.

FIG. 3 is a circuit diagram illustrating a pixel circuit according to a current driving method of the related art.

Referring to FIG. 3, when transistors M2 and M3 are turned on by a selection signal transmitted from a selection scanning line Sn, a transistor M1 as a P-channel transistor is diode-connected, and a current flows to charge a capacitor C1, thereby decreasing a gate potential of the transistor M1. Accordingly, a current flows from a source to a drain of the transistor M1. As time passes, a charge voltage of the capacitor C1 is increased, and when a drain current of the transistor M1 and a drain current of the transistor M2 are equal, the charge current of the capacitor C1 is stopped, and the charge voltage is stabilized. Then, the selection signal from the selection scanning line Sn becomes high-level, and thus the transistors M2 and M3 are turned off. In addition, a light emitting signal from a light emitting scanning line En becomes low-level, thereby turning on a transistor M4. Then power is supplied from a power source VDD, and a driving current $I_{OLED}$ corresponding to the charge voltage stored in the capacitor C1 flows to an OLED, thereby emitting light at a corresponding luminance.

Figure 4:
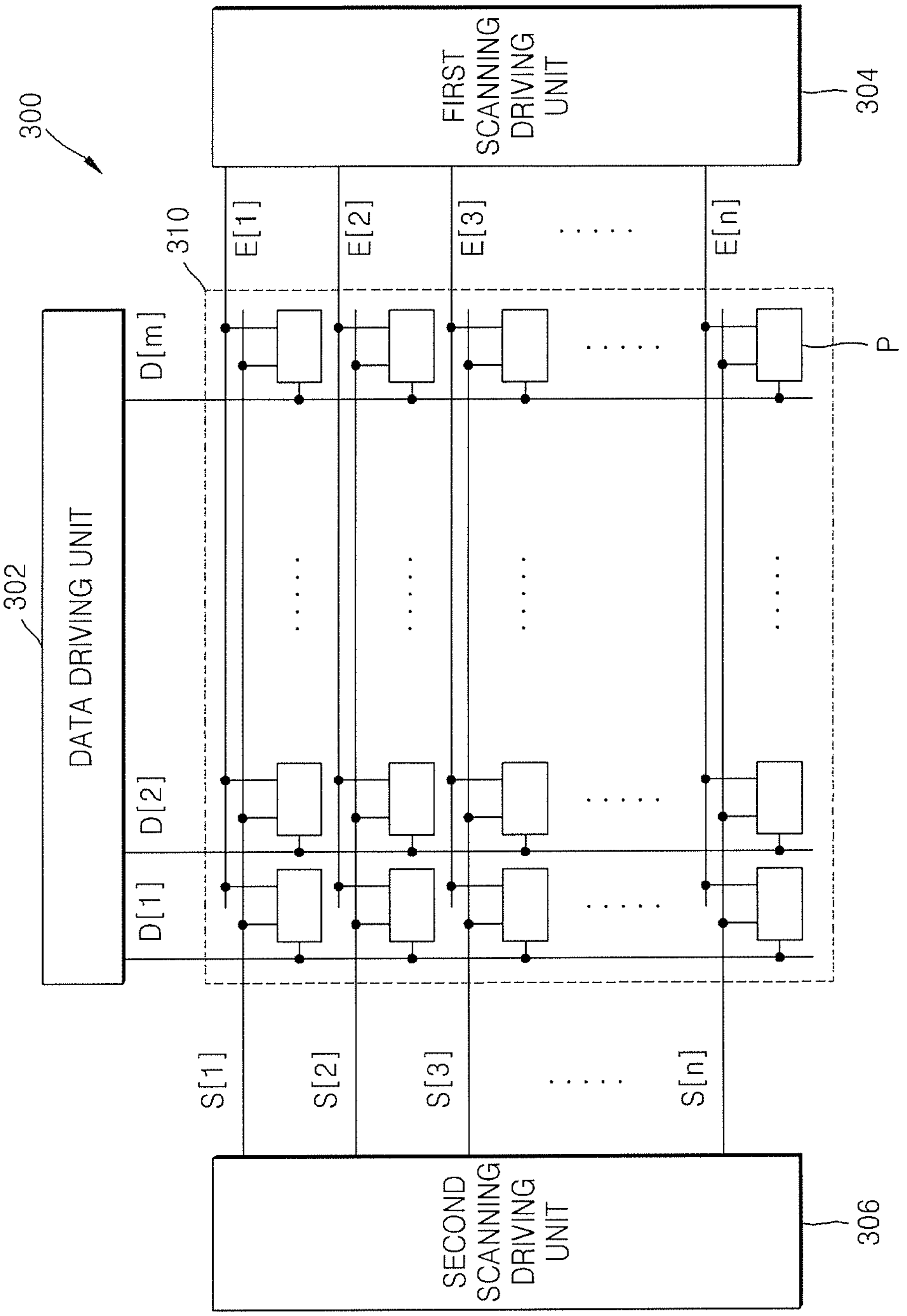
FIG. 4 is a schematic diagram illustrating an organic light emitting display device according to an embodiment of the present invention.

FIG. 4 is a schematic diagram illustrating an organic light emitting display device 300 according to an embodiment of the present invention.

Referring to FIG. 4, the organic light emitting display device 300 includes a data driving unit 302 (e.g., a data driver), a first scanning driving unit 304 (e.g., a first scanning driver), a second scanning driving unit 306 (e.g., a second scanning driver), and an organic light emitting display panel 310.

The data driving unit 302 applies one of data signals D[1], . . . , D[m] to a data line. According to an embodiment of the present invention, a pixel circuit is driven according to a current programming method, and a current source included in the data driving unit 302 outputs the data signal applied to the pixel circuit.

The first scanning driving unit 304 applies one of light emitting signals E[1], . . . , E[n] to a light emitting scanning line. A driving current according to a voltage stored in a storage device (e.g., capacitor) included in a pixel circuit P is applied in accordance with the light emitting signal to the organic light emitting display device 300, and the organic light emitting display device 300 emits light accordingly.

The second scanning driving unit 306 applies selection signals S[1], . . . , S[n] to selection scanning lines. The selection signals S[1], . . . , S[n] are sequentially applied to the selection scanning lines, and the data signal is applied to the pixel circuit P according to the selection signals S[1], . . . , S[n].

The organic light emitting display panel 310 includes a plurality of pixel circuits P for driving a plurality of pixels that are defined in an area where selection scanning lines and data lines cross each other.

Figure 5:
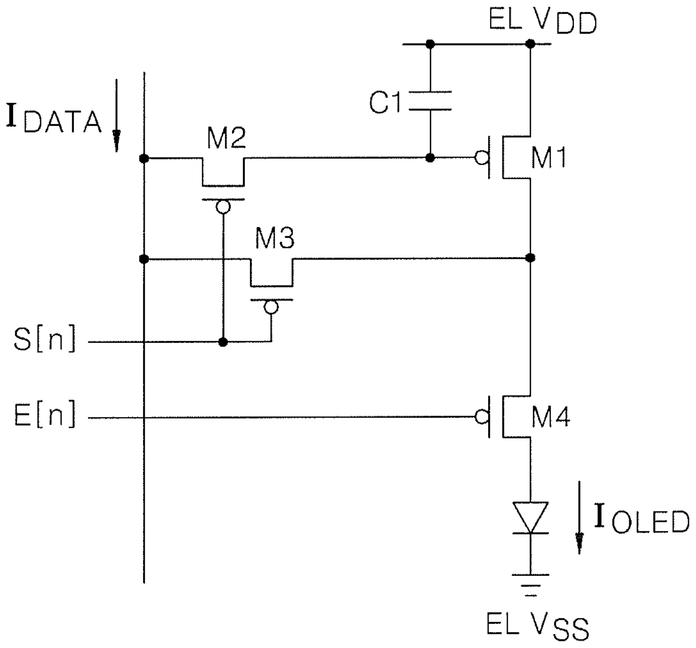
FIG. 5 is a schematic circuit diagram illustrating an embodiment of a pixel circuit of FIG. 4.

FIG. 5 illustrates an embodiment of the pixel circuit P illustrated in FIG. 4.

The pixel circuit P is a light emitting device, and includes an organic light emitting device (e.g., OLED), a transistor M1, first through third switching devices M2, M3, and M4, and a storage capacitor C1. The transistor M1 and the first through third switching devices M2, M3, and M4 may be the same type of transistors, and are illustrated as P-channel transistors in FIG. 5.

The first switching device M2 is connected between a data line and a gate of the transistor M1, and transmits a data signal D[m] transmitted from the data line, which is a data current $I_{DATA}$, to the transistor M1 in response to a selection signal S[n] transmitted from a selection scanning line. The second switching device M3 is connected between the data line and a drain of the transistor M1, and diode-connects the transistor M1 in response to the selection signal S[n] from the selection scanning line. A source of the transistor M1 is connected to a first voltage source VDD, and the drain of the transistor M1 is connected to the third switching device M4, and the storage capacitor C1 is connected between the gate and the source of the transistor M1. The third switching device M4 is connected between the organic light emitting device and the drain of the transistor M1 and responds to a light emitting signal E[n] so that a driving current $I_{OLED}$ corresponding to a voltage between the gate and the source of the transistor M1 may flow to the organic light emitting device.

Figure 6:
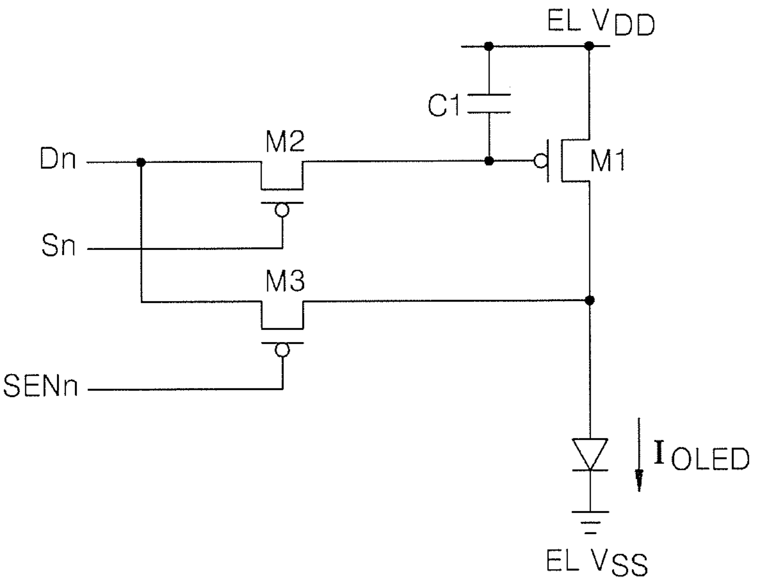
FIG. 6 is a schematic circuit diagram illustrating a pixel circuit for external compensation according to an embodiment of the present invention.

FIG. 6 is a schematic circuit diagram of a pixel circuit 600 with external compensation according to an embodiment of the present invention.

Referring to FIG. 6, the pixel circuit 600 has a configuration similar to the pixel circuit illustrated in FIG. 2. In FIG. 6, a second switching transistor M3 is connected between a source electrode of a first switching transistor M2 and a drain electrode of a driving transistor M1. The second switching transistor M3 performs a switching operation according to a sensing signal SENn. The second switching transistor M3 is illustrated as a P-type metal oxide semiconductor (PMOS) transistor and is turned off when the sensing signal SENn is high level and turned on when the sensing signal SENn is low level. The sensing signal SENn, which drives the second switching transistor M3, stays as a high level signal when the pixel circuit 600 operates in a display mode and is converted to a low level signal when the second switching transistor M3 operates in a sensing mode. In FIG. 6, the second switching transistor M3 is a PMOS transistor, but it may alternatively be an N-type MOS (NMOS) transistor or a complementary MOS (CMOS) transistor in other embodiments.

Figure 7:
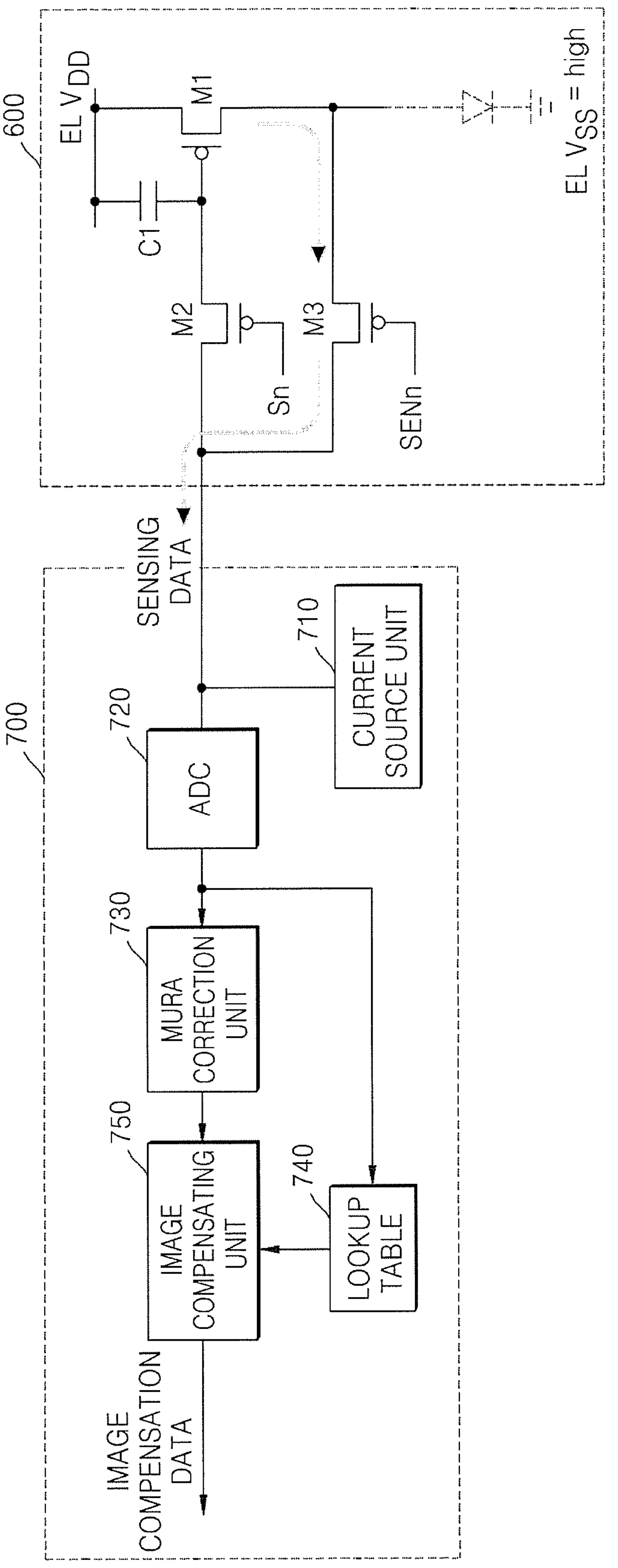
FIG. 7 is a schematic diagram illustrating a pixel circuit and an external sensing circuit for external compensation according to another embodiment of the present invention.

FIG. 7 is a schematic diagram illustrating the pixel circuit 600 and a sensing circuit unit 700 (e.g., a sensing circuit) for external compensation according to another embodiment of the present invention.

Referring to FIG. 7, the pixel circuit 600 and the sensing circuit unit 700 for external compensation are illustrated together. The sensing circuit unit 700 is separate from the pixel circuit 600 and may be implemented without having to modify a previously existing pixel circuit. For example, the sensing circuit unit 700 may be included in a driver integrated circuit (IC) of the data driving unit 302, of the first scanning driving unit 304, of the second scanning driving unit 306, or of the like, as illustrated in FIG. 4.

The sensing circuit unit 700 includes a current source unit 710 (e.g., a current source), an analog-digital converting unit 720 (e.g., an analog-digital converting circuit), a mura correction unit 730 (e.g., a mura correction circuit), a lookup table 740, and an image compensating unit 750 (e.g., an image compensating circuit).

The current source unit 710 provides a current for adjusting a gate-source voltage Vgs of the driving transistor M1. The current source unit 710 provides a constant current at a front end of the analog-digital converting unit 720. The current source unit 710 includes a current source, and the gate-source voltage Vgs of the driving transistor M1 is adjusted to adjust a constant current supplied by the driving transistor M1.

The analog-digital converting unit 720 converts a sensed current into a digital current value to output as sensing data.

The mura correction unit 730 compares the sensing data with original data provided from the pixel circuit 600 to generate mura correction data. Here, for mura correction, the mura correction data is generated by sensing a current of the driving transistor M1 and calculating the value of the current of the driving transistor M1 distributed to the pixel circuits.

The image compensating unit 750 generates image compensation data to compensate for image sticking in accordance with the mura correction data generated by the mura correction unit 730 and sensing data stored in the lookup table 740. In order to compensate for image sticking, the current of the driving transistor M1 is sensed again after a period (e.g., a predetermined period) of time to compare new data sensed from the driving transistor M1 with data previously sensed from the driving transistor M1, and the newly sensed data is stored in the lookup table 740. The image compensating unit 750 outputs image compensation data to compensate for image sticking in accordance with the mura correction data and the sensing data stored in the lookup table 740. The lookup table 740 may be stored in one selected from the group consisting of a programmable read only memory (PROM), an erasable PROM (EPROM), an electrically erasable PROM (EEPROM), a flash memory, or any other suitable equivalent devices.

The operation of the organic light emitting display device illustrated in FIG. 7 will be described hereinafter in more detail.

When the pixel circuit 600 performs a display operation, the sensing signal SENn is maintained at a high level. When the pixel circuit 600 performs a sensing operation, the sensing signal SENn is changed to a low level, and a high level voltage ELVss is applied to a cathode electrode of an OLED. Accordingly, the OLED is reverse-biased and behaves as an open circuit, and a current flows through the driving transistor M1 to the sensing circuit 700 according to a switching operation of the second switching transistor M3.

A current value input to the sensing circuit 700 is converted into a digital value in the analog-digital converting unit 720, thereby generating sensing data. The sensing current corresponds to the amplitude of a current provided by the current source unit 710.

The mura correction unit 730 and the image compensating unit 750 correct mura and perform image sticking compensation based on the sensing data.

Figure 8:
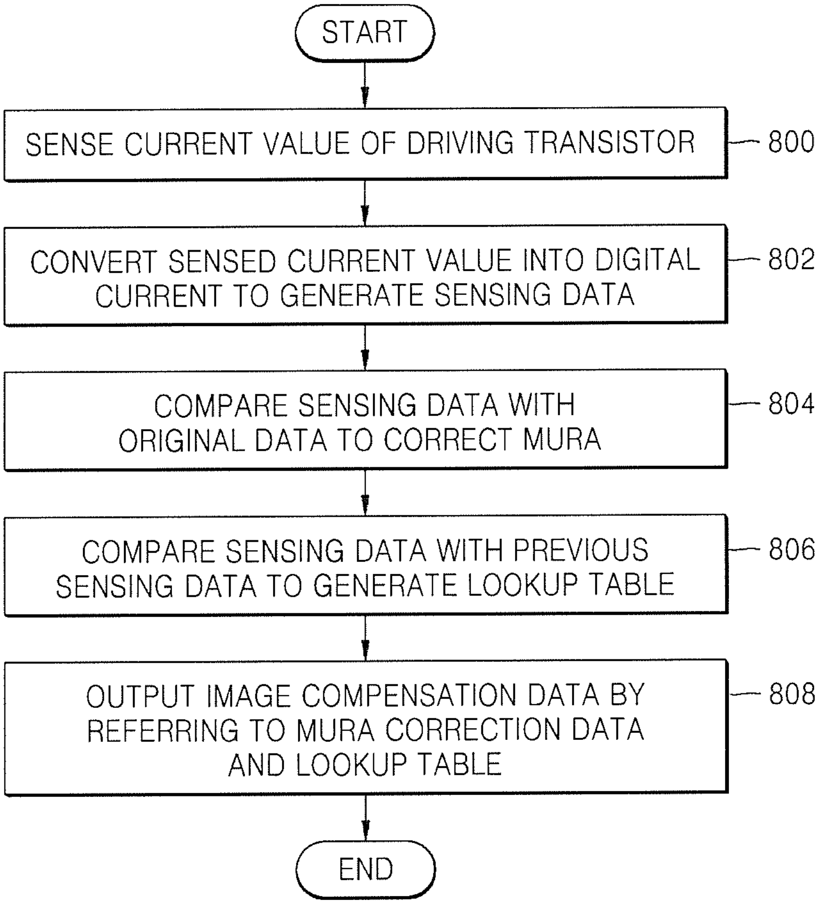
FIG. 8 is a flowchart illustrating an image compensating method of an organic light emitting display device according to an embodiment of the present invention.

FIG. 8 is a flowchart illustrating a method of compensating for image sticking of an organic light emitting display device according to an embodiment of the present invention.

Referring to FIG. 8, in operation 800, a current value of a current supplied by a driving transistor is sensed. In operation 802, the sensed current value is converted into a digital value to generate sensing data. In operation 804, the sensing data and original data are compared to generate mura correction data. In operation 806, the sensing data and previous sensing data are compared to generate a lookup table. In operation 808, image compensation data is output according to the mura correction data and the lookup table. Accordingly, mura or spots and an afterimage effect or image sticking generated due to deterioration of a driving transistor may be removed.

The driving transistor and the switching transistors in the above described embodiments and drawings are PMOS transistors, but NMOS transistors or CMOS transistors may also be used.

While the embodiments of the present invention has been particularly shown and described, the exemplary embodiments should be considered in a descriptive sense only and not for purposes of limitation. Accordingly, it will be understood by those skilled in the art that various changes in form and details may be made without departing from the spirit and scope of the present invention as defined by the appended claims and their equivalents.

What is claimed is:

1. An organic light emitting display device comprising:

a plurality of pixels, each of the pixels comprising:

an organic light emitting diode; and a pixel circuit comprising a driving transistor for driving the organic light emitting diode and a switching transistor for switching a current flowing through the driving transistor in response to a sensing signal; and a sensing circuit for sensing the current, converting the current into sensing data, and performing mura correction and image compensation for image sticking based on the sensing data and a lookup table, wherein the lookup table is generated by comparing the sensing data with previously sensed sensing data, wherein the sensing circuit comprises:

an analog-digital converting circuit for converting the current into the sensing data;

a mura correction circuit for comparing the sensing data with original data provided from the pixel circuit to generate mura correction data; and an image compensating circuit for generating image compensation data to compensate for image sticking in accordance with the mura correction data and the lookup table wherein the sensing circuit further comprises a current source configured to provide a constant current at a front end of the analog-digital converting circuit.

2. The organic light emitting display device of claim 1, wherein the sensing circuit is separated from the pixels.

3. The organic light emitting display device of claim 1, wherein the pixel circuit is configured to apply a voltage to a cathode electrode of the organic light emitting diode such that the organic light emitting diode is reverse-biased when the sensing signal is applied to turn on the switching transistor.

4. An organic light emitting display device comprising:

a plurality of pixels, each of the pixels comprising:

an organic light emitting diode;

a pixel circuit comprising a driving transistor for driving the organic light emitting diode, and a switching transistor for switching a current flowing through the driving transistor in response to a sensing signal;

a current source for providing a current for adjusting a gate-source voltage of the driving transistor;

an analog-digital converting circuit for converting the current into sensing data;

a mura correction circuit for comparing the sensing data with original data provided from the pixel circuit to generate mura correction data; and an image compensating circuit for generating image compensation data to compensate for image sticking in accordance with the mura correction data and a lookup table, wherein the lookup table is generated by comparing the sensing data with previously sensed sensing data;

wherein the current source is configured to provide a constant current at a front end of the analog-digital converting circuit.

5. A method of compensating for an image displayed by an organic light emitting display device comprising an organic light emitting diode and a pixel circuit comprising a driving transistor for driving the organic light emitting diode, the method comprising:

providing a constant current for adjusting a gate-source voltage of the driving transistor;

sensing a current supplied by the driving transistor and converting the current into sensing data;

comparing the sensing data with original data to generate mura correction data; and generating image compensation data to compensate for image sticking of the organic light emitting display device in accordance with the mura correction data and a lookup table that is generated by comparing the sensing data with previously sensed sensing data.

6. The method of claim 5, further comprising reverse-biasing the organic light emitting diode by applying a voltage to a cathode electrode of the organic light emitting diode.

7. The method of claim 6, further comprising sensing the current supplied by the driving transistor by turning on a switching transistor coupled to the driving transistor in response to a sensing signal.

8. The method of claim 5, wherein the sensed current corresponds to an amplitude of the constant current provided by a current source at a front end of an analog-digital converting circuit configured to convert the sensed current into the sensing data.

* * * * *